(12) United States Patent
Thomas (10) Patent No.: US 8,954,656 B2
(45) Date of Patent: Feb. 10, 2015

(54) METHOD AND SYSTEM FOR REDUCING MAPPING TABLE SIZE IN A STORAGE DEVICE

(71) Applicant: Nicholas James Thomas, Dundee (GB)

(72) Inventor: Nicholas James Thomas, Dundee (GB)

(73) Assignee: SanDisk Technologies Inc., Plano, TX (US)

( * ) Notice: Subject to any disclaimer, the term of this patent is extended or adjusted under 35 U.S.C. 154(b) by 168 days.

(21) Appl. No.: 13/773,946

(22) Filed: Feb. 22, 2013

(65) Prior Publication Data

US 2014/0181371 A1 Jun. 26, 2014

Related U.S. Application Data

(60) Provisional application No. 61/740,310, filed on Dec. 20, 2012.

(51) Int. Cl.
*G06F 12/00* (2006.01)
*G06F 12/02* (2006.01)
*G06F 3/06* (2006.01)
*G06F 12/08* (2006.01)

(52) U.S. Cl.
CPC .............. *G06F 12/0246* (2013.01); *G06F 3/06* (2013.01); *G06F 12/0862* (2013.01); *G06F 2212/1016* (2013.01); *G06F 2212/1048* (2013.01); *G06F 2212/7201* (2013.01); *G06F 2212/7202* (2013.01); *G06F 2212/7207* (2013.01)
USPC ........... 711/103; 711/104; 711/156; 711/170; 711/202

(58) Field of Classification Search
None
See application file for complete search history.

(56) References Cited

U.S. PATENT DOCUMENTS

| 5,630,093 A | 5/1997 | Holzhammer et al. |
| 7,975,109 B2 | 7/2011 | McWilliams et al. |
| 2007/0005929 A1 | 1/2007 | Post et al. |

*Primary Examiner* — Shawn X Gu
(74) *Attorney, Agent, or Firm* — Brinks Gilson & Lione (57) ABSTRACT

A method and system are disclosed for handling logical-to-physical mapping and reducing mapping table size. The method includes the storage device storing in fast access memory, such as DRAM, only the physical location of a primary cluster in each cluster group, and then writing location information for remaining clusters in a cluster group into the header of the data for the primary cluster of the cluster group in non-volatile memory. The system includes a storage device having volatile memory, non-volatile memory and a controller in communication with the volatile and non-volatile memory that is configured to carry out the method noted above.

20 Claims, 7 Drawing Sheets

900 — PRIMARY MAPPING TABLE

| CLUSTER GROUP | PRIMARY CLUSTER LOCATION | STATUS OF NON-PRIMARY CLUSTERS |
|---|---|---|
| $N_0$(0-1) | (0)A0 | 0 |
| $N_1$(2-3) | (3)A3 | 1 |
| $N_2$(4-5) | (4)A4 | 1 |
| $N_3$(6-7) | (7)A7 | 1 |
| ... | ... | ... |
| $N_x$(Y-Z) | (Y)AY | 1 |

1000 — NON-VOLATILE MEMORY

| PHYSICAL ADDRESS | HEADER INFORMATION | DATA |
|---|---|---|
| A0 | POINTER TO A1 | A0 DATA |
| A1 |  | A1 DATA |
| A2 |  | A2 DATA |
| A3 | POINTER TO A2 | A3 DATA |
| A4 | POINTER TO A5 | A4 DATA |
| A5 |  | A5 DATA |
| A6 |  | A6 DATA |
| A7 | POINTER TO A6 | A7 DATA |

METHOD AND SYSTEM FOR REDUCING MAPPING TABLE SIZE IN A STORAGE DEVICE

CROSS-REFERENCE TO RELATED APPLICATIONS

This application claims the benefit of U.S. App. No. 61/740,310, filed Dec. 20, 2012, the entirety of which is incorporated herein by reference.

TECHNICAL FIELD

This application relates generally to a method and system for managing the storage of data in a data storage device.

BACKGROUND

Non-volatile memory systems, such as flash memory, are used in digital computing systems as a means to store data and have been widely adopted for use in consumer products. Flash memory may be found in different forms, for example in the form of a portable memory card that can be carried between host devices or as a solid state disk (SSD) embedded in a host device. These memory systems typically work with data units called "pages" that can be written, and groups of pages called "blocks" that can be read and erased, by a storage manager often residing in the memory system.

In a SSD there is a mapping table or other data structure that typically stores a map of all logical addresses to physical addresses in the SSD. When data is written to a flash memory, the mapping table or other data structure that tracks the location of data in the flash memory must be updated. The time involved in updating data structures for file systems to reflect changes to files and directories, and accessing these data structures, may affect the performance of the storage device. Typically, runs of logical addresses exist which are written at the same time to contiguous runs of physical addresses, but the memory system should to be able to handle worst case scenarios where no contiguous runs exist and each logical address is mapped to randomly to different physical addresses.

Thus, in SSDs or other flash storage devices, a fine granularity mapping table is required to allow best write performance. This table can typically be very large. The full table or subparts of it are generally required to perform read and write tasks so it is desirable to store a working copy in dynamic random access memory (DRAM) to ease random read and write overhead. It may not be economically feasible or technologically viable to use a DRAM sufficiently large to hold the entire table. However, if the entire mapping table is not held in DRAM then read and write performance may slow down and write wear may increase in any flash memory that is used to hold portions of the mapping table that is not held in the DRAM.

BRIEF SUMMARY

In order to address the problems and challenges noted above, a system and method for handling logical-to-physical mapping in a flash memory system is disclosed.

According to a first aspect, method is disclosed where, in a memory device having a non-volatile memory, a volatile memory and a controller in communication with the non-volatile memory and the volatile memory, the controller maintains an index table in the volatile memory. The index table is configured to store a predetermined number of index entries where each of the predetermined number of index entries is associated with a cluster group, each cluster group having a fixed plurality of clusters, where each cluster group comprises a predetermined number of logically contiguous clusters and each of the predetermined number of index entries is configured to contain physical address information for only one cluster of the cluster group associated with that index entry. The method includes receiving data associated with a cluster in a data write command and determining a physical location in the non-volatile memory for storing the cluster. The method includes then identifying in the index table an index entry associated with the cluster and storing in the volatile memory an address of the physical location for the cluster in the identified index entry. Further, the method includes storing in the physical location in the non-volatile memory the received data for the cluster and storing, in a header of the received data stored at the physical location, location information of each of a remainder of the clusters in the cluster group associated with the identified index entry. In this manner, the index entry in the volatile memory contains the address of the physical location of only one of the clusters in the cluster group, and the header of the data at the physical location contains location information for the remainder of the clusters in the cluster group associated with the index entry.

According to another aspect, a storage device is disclosed. The storage device includes a non-volatile memory, a volatile memory; and a controller in communication with the non-volatile memory and the volatile memory. The controller is configured to maintain an index table in the volatile memory, the index table sized to store a predetermined number of index entries where each of the predetermined number of index entries is associated with a cluster group, each cluster group having a predetermined number of logically contiguous clusters and each of the predetermined number of index entries is configured to contain physical address information for only one cluster of the cluster group associated with that index entry. The controller is further configured to receive data associated with a cluster in a data write command, determine a physical location in the non-volatile memory for storing the cluster and identify in the index table an index entry associated with the cluster. The controller is further configured to store in the volatile memory an address of the physical location for the cluster in the identified index entry, store in the physical location in the non-volatile memory the received data for the cluster, and store, in a header of the received data stored at the physical location, location information of each of a remainder of the clusters in the cluster groups associated with the identified index entry.

In other aspects, the method and system may determine if the index table has empty entries, for example by using spare bits in entries of the index table to indicate whether clusters in a cluster group contain valid data, and then use the empty index entries for storing physical location information for a non-primary cluster of a different cluster group.

Other embodiments are disclosed, and each of the embodiments can be used alone or together in combination. The embodiments will now be described with reference to the attached drawings.

DETAILED DESCRIPTION

Figure 1:
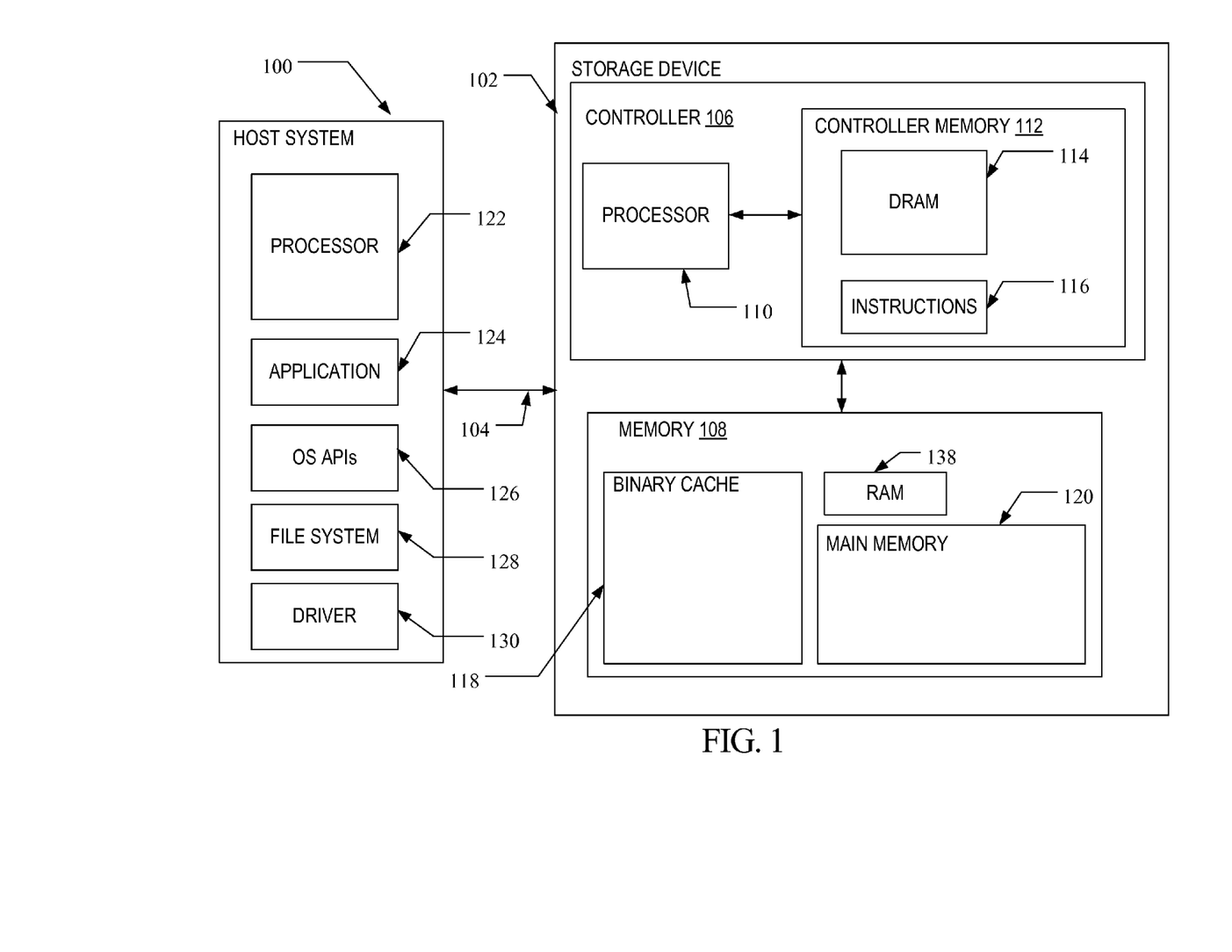
FIG. 1 illustrates a block diagram of host and storage device according to one embodiment.

A flash memory system suitable for use in implementing aspects of the invention is shown in FIG. 1. A host system 100 stores data into, and retrieves data from, a storage device 102. The storage device 102 may be embedded in the host system 100 or may exist in the form of a card or other removable drive, such as a solid state disk (SSD) that is removably connected to the host system 100 through a mechanical and electrical connector. The host system 100 may be any of a number of fixed or portable data generating devices, such as a personal computer, a mobile telephone, a personal digital assistant (PDA), or the like. The host system 100 communicates with the storage device over a communication channel 104.

The storage device 102 contains a controller 106 and a memory 108. As shown in FIG. 1, the controller 106 includes a processor 110 and a controller memory 112. The processor 110 may comprise a microprocessor, a microcontroller, an application specific integrated circuit (ASIC), a field programmable gate array, a logical digital circuit, or other now known or later developed logical processing capability. The controller memory 112 may include volatile memory such as dynamic random access memory (DRAM) 114 and/or non-volatile memory, and processor executable instructions 116 for handling memory management.

As discussed in more detail below, the storage device 102 may include functions for memory management. In operation, the processor 110 may execute memory management instructions (which may be resident in instructions 116) for operation of memory management functions. The memory management functions may control the assignment of the one or more portions of the memory 108 within storage device 102.

The memory 108 may include non-volatile memory (such as flash memory). One or more memory types may be included in memory 108. The memory may include cache storage (also referred to as binary cache) 118 and main memory (also referred to as long term memory) 120 that may be made up of the same type of flash memory cell or different types of flash memory cells. For example, the cache storage 118 may be configured in a single level cell (SLC) type of flash configuration having a one bit per cell capacity while the long term storage 120 may consist of a multi-level cell (MLC) type flash memory configuration having two or more bit per cell capacity to take advantage of the higher write speed of SLC flash and the higher density of MLC flash. Different combinations of flash memory types are also contemplated for the cache storage 118 and long term storage 120. Additionally, the memory 108 may also include volatile memory such as random access memory (RAM) 138.

The binary cache and main storage of memory 108 include physical blocks of flash memory that each consists of a group of pages, where a block is a group of pages and a page is a smallest unit of writing in the memory. The physical blocks in the memory include operative blocks that are represented as logical blocks to the file system 128. The storage device 102 may be in the form of a portable flash drive, an integrated solid state drive or any of a number of known flash drive formats. In yet other embodiments, the storage device 102 may include only a single type of flash memory having one or more partitions.

Figure 2:
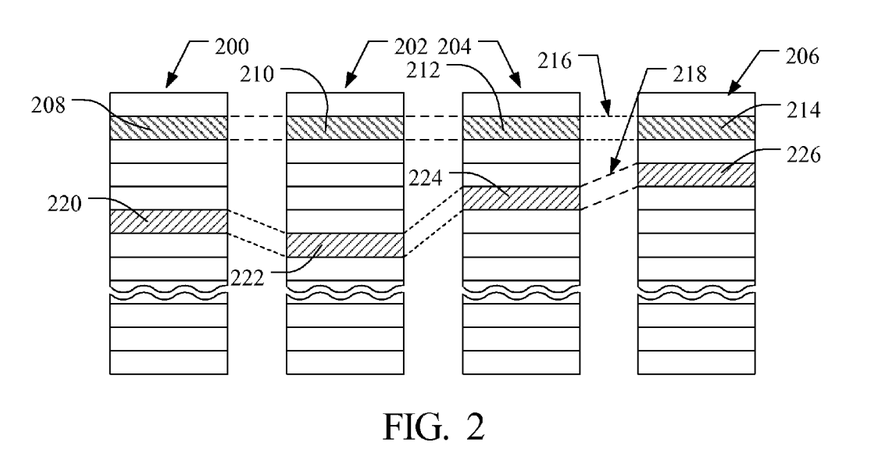
FIG. 2 illustrates an example physical memory organization of the memory in the storage device of FIG. 1.

Referring to FIG. 2, the binary cache and main memories 118, 120 (e.g. SLC and MLC flash respectively) may be arranged in blocks of memory cells. In the example of FIG. 2, four planes or sub-arrays 200, 202, 204 and 206 memory cells are shown that may be on a single integrated memory cell chip, on two chips (two of the planes on each chip) or on four separate chips. The specific arrangement is not important to the discussion below and other numbers of planes may exist in a system. The planes are individually divided into blocks of memory cells shown in FIG. 2 by rectangles, such as blocks 208, 210, 212 and 214, located in respective planes 200, 202, 204 and 206. There may be dozens or hundreds of blocks in each plane. Blocks may be logically linked together to form a metablock that may be erased as a single unit. For example, blocks 208, 210, 212 and 214 may form a first metablock 216. The blocks used to form a metablock need not be restricted to the same relative locations within their respective planes, as is shown in the second metablock 218 made up of blocks 220, 222, 224 and 226.

Figure 3:
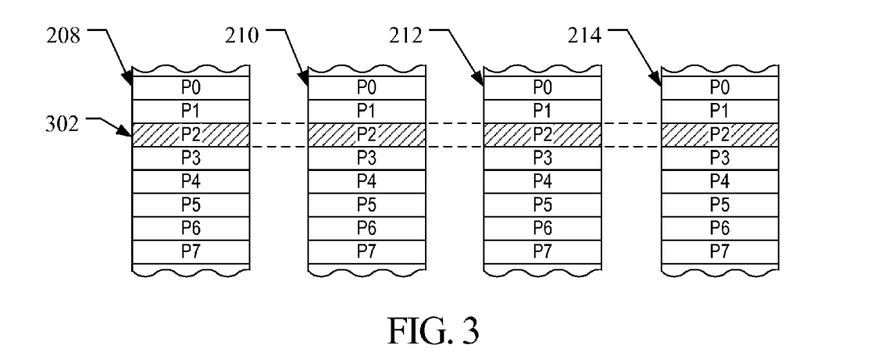
FIG. 3 shows an expanded view of a portion of the physical memory of FIG. 2.

The individual blocks are in turn divided for operational purposes into pages of memory cells, as illustrated in FIG. 3. The memory cells of each of blocks 208, 210, 212 and 214, for example, are each divided into eight pages P0-P7. Alternately, there may be 16, 32 or more pages of memory cells within each block. A page is the unit of data programming and reading within a block, containing the minimum amount of data that are programmed or read at one time. A metapage 302 is illustrated in FIG. 3 as formed of one physical page for each of the four blocks 208, 210, 212 and 214. The metapage 302 includes the page P2 in each of the four blocks but the pages of a metapage need not necessarily have the same relative position within each of the blocks. A metapage is the maximum unit of programming. The blocks disclosed in FIGS. 2-3 are referred to herein as physical blocks because they relate to groups of physical memory cells as discussed above. As used herein, a logical block is a virtual unit of address space defined to have the same size as a physical block. Each logical block includes a range of logical block addresses (LBAs) that are associated with data received from a host 100. The LBAs are then mapped to one or more physical blocks in the storage device 102 where the data is physically stored.

Referring again to FIG. 1, the host 100 may include a processor 122 that runs one or more application programs 124. The application programs 124, when data is to be stored on or retrieved from the storage device 102, communicate through one or more operating system application programming interfaces (APIs) 126 with the file system 128. The file system 128 may be a software module executed on the processor 122 and manages the files in the storage device 102.

The file system 128 manages clusters of data in logical address space. Common operations executed by a file system 128 include operations to create, open, write (store) data, read (retrieve) data, seek a specific location in a file, move, copy, and delete files. The file system 128 may be circuitry, software, or a combination of circuitry and software.

Accordingly, the file system 128 may be a stand-alone chip or software executable by the processor of the host 100. A storage device driver 130 on the host 100 translates instructions from the file system 128 for transmission over a communication channel 104 between the host 100 and storage device 102. The interface for communicating over the communication channel may be any of a number of known interfaces, such as SD, MMC, USB storage device, SATA and SCSI interfaces. A file system data structure 132, such as a file allocation table (FAT), may be stored in the memory 108 of the storage device 102. Although shown as residing in the binary cache portion 118 of the memory 108, the file system data structure 132 may be located in the main memory 120 or in another memory location on the storage device 102.

In addition to the user data and host-generated file system tables that may be stored in flash memory on the storage device, the storage device itself stores and maintains a mapping table or other data structure that tracks the logical addresses supplied by the host file system and the physical addresses where the storage device is keeping the data. One way to maintain a primary mapping table of all logical to physical address relationships in the storage device is to maintain the entire table in flash memory (such as NAND flash) and to then copy the entire table into fast access memory such as the DRAM 114 in the controller 106 of the storage device 102. In some storage device architectures a limited amount of DRAM is available, where the DRAM space is needed both to cache data written to or read from the NAND flash and to handle mapping table data, and the DRAM is not big enough to hold the entire mapping table.

Figure 4:
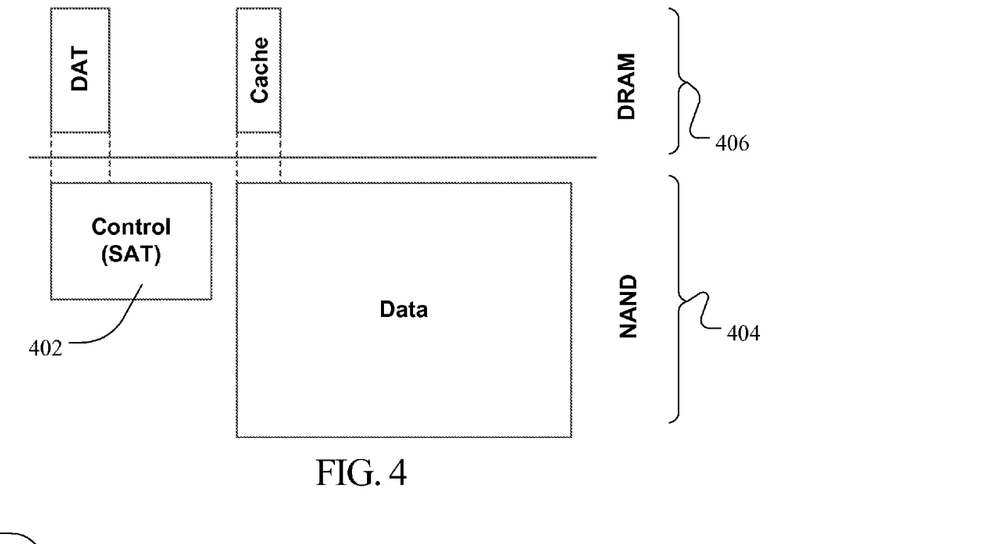
FIG. 4 illustrates an embodiment of a storage device having a selected portion of a mapping table stored in DRAM.
Figure 5:
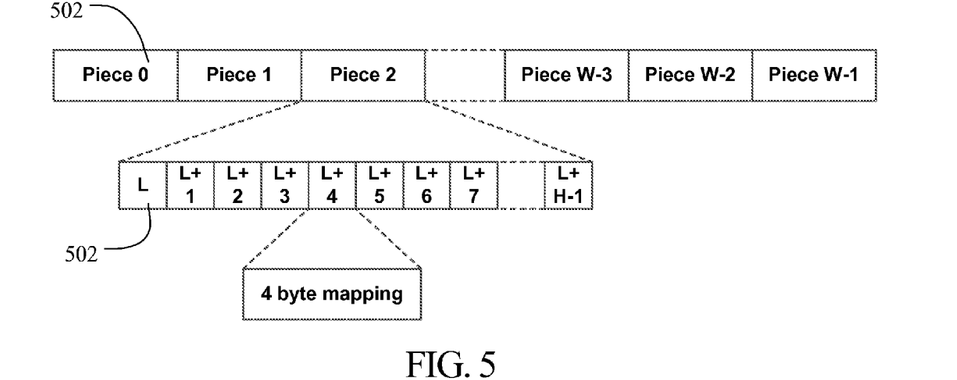
FIG. 5 illustrates one primary logical to physical mapping table layout usable in the primary mapping table of FIG. 4.

As shown in FIGS. 4-5, in this architecture the mapping table 402 and user data 408 mapped by the mapping table 402 are contained in NAND flash 404. The mapping table 402 may be broken down into a number of equal pieces and the most active pieces brought into a table 406 in fast access media such as DRAM 406. With this arrangement, during random access to the storage device, some pieces of the mapping table can be accessed from the DRAM 406 or other fast access media, but the remainder must be accessed from NAND 404 at a performance penalty. FIG. 5 shows how the mapping space may be broken down into W pieces 502, each piece having a size of H clusters 504, where W and H are whole numbers. In the example of FIG. 5, each of the H clusters is mapped using 4 bytes of data.

Figure 6:
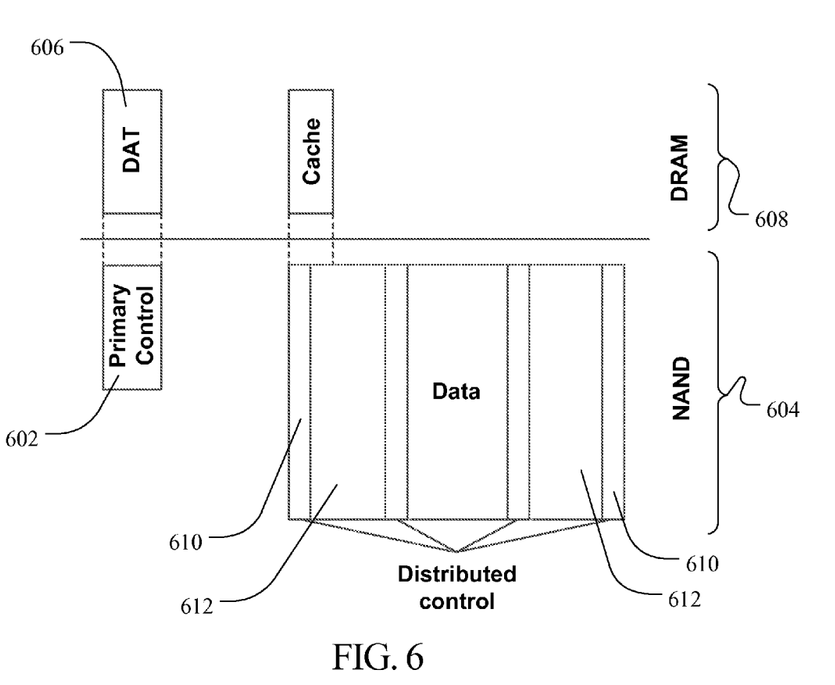
FIG. 6 illustrates an example of a storage device having a primary mapping table sized to fit in DRAM of the storage device and distributed mapping data in headers of data in NAND of the storage device.
Figure 7:
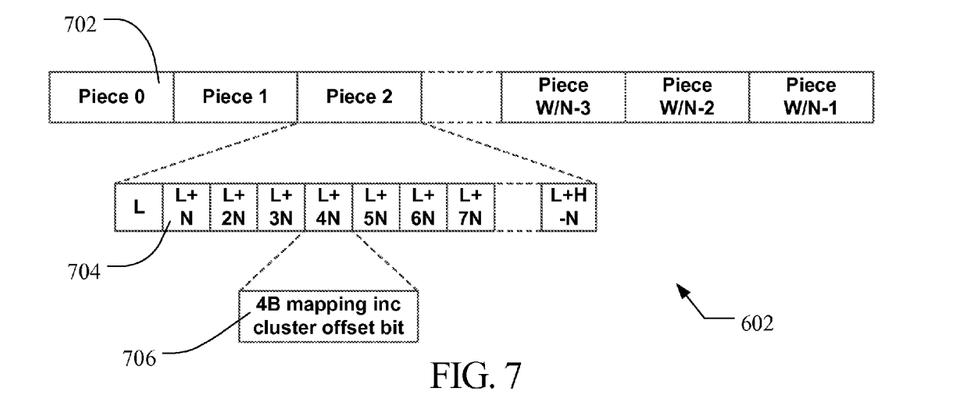
FIG. 7 illustrates one primary logical to physical mapping table layout usable in the primary mapping table of FIG. 6.

A technique for reducing the problem of slower mapping data access due to portions that are stored only in NAND flash memory involves shrinking the size of the primary mapping table as illustrated in FIGS. 6-7. Referring now to FIG. 6, an arrangement for managing a logical-to-physical mapping table 602 or other data structure is illustrated where the mapping table 602 in NAND 604 may be kept as a fast access table 606 in DRAM 608. In one embodiment, the logical to physical mapping scheme implemented by the controller of the storage device will place entries in DRAM and embed a remainder of the control table in headers 610 of NAND (flash) data 612 associated with the entries in DRAM 608. In one embodiment, DRAM 608 may be in the controller of the storage device, such as DRAM 114 (FIG. 1).

Although it is not necessary to fully fit the primary mapping table 602 into DRAM 608, it is very beneficial to do so. To achieve this shrinking of the primary mapping table 602, clusters within the control table are grouped together in logically contiguous sets referred to herein as cluster groups and only the most recently written cluster in the cluster group (typically the first cluster in address order for a cluster group) is written into DRAM. If each data cluster is D sectors and D clusters are grouped into groups containing N clusters then each set represents M=D*N sectors. In one implementation, only one mapping table entry exists per M sectors such that the primary mapping table is therefore 1/N times the size of the whole control table. The remaining (N−1)/N part of the whole control table is distributed amongst the data within the data headers as illustrated in FIG. 7.

The distributed portion of the mapping data stored in the headers 610 of the actual data in NAND 604 is only needed if the relevant mapping data is not present or cannot be inferred from the primary mapping table in DRAM 608. In normal storage device usage it is anticipated that the distributed mapping table (the portion of each of the M sets that is stored in extra bits in the header of the data stored in NAND) will be used infrequently.

FIG. 7 shows the make-up of the primary mapping table 602. Note that there are now fewer pieces 702 than the original scheme discussed with respect to FIGS. 4-5, though the format remains broadly the same. The mapping table reduction scheme works on the following principles: 1) The primary mapping table always contains the physical address of the most recently written cluster or clusters within the N clusters of a group; and 2) The header data of the most recently written cluster (or first cluster of the most recently written set of logically and physically contiguous clusters) contains the physical addresses of all N−1 other clusters within its group.

Each time one or more of the N clusters is written physically contiguously to NAND, the primary control table 602 is updated with its new location. In one embodiment, the memory mapping algorithm will write full clusters together in the order in which they arrive at the storage device 102 in an open block in the memory 108. Within the primary control table mapping field 706 are some extra bits to indicate the offset of the first contiguous cluster that was written, i.e., to indicate the logical address to which the mapping address refers. Assuming all N clusters within this cluster group are written physically contiguously then the mapping address held in the primary mapping table 602 is sufficient to locate all clusters by inference of that contiguity. A further bit may be used within the mapping field 706 of the primary mapping table 602, so that this case is known and not simply inferred. If all N clusters are not written physically contiguously, then the current physical location(s) of the logical clusters which are not being written physically contiguously must be written within the header data of the first cluster within the subset of N logically contiguous clusters being written physically contiguously. The physical locations of these clusters may be found through the address translation mechanism described below.

Address translation is used for host reads (when a user is requesting his or her data) or during some control updates (e.g., during a write operation). To address translate (i.e., evaluate the physical location of a logical cluster), the primary mapping table in DRAM 606 is first read. If the primary mapping table cluster offset bit matches the offset of the logical cluster within the N clusters of the group then the mapping address in the primary address table is the physical location of the desired cluster. If the bit indicating all N clusters were written physically contiguously is set then the desired physical address is the mapping address in the primary mapping table with additional offset according to the logical offset of the desired cluster within the N of the group. In either of these cases for a host read the data may now be read by reading the physical location obtained from the address translation. Otherwise, the data address indicated by the primary mapping table 606 in DRAM is read up to and including the address of the desired cluster on the assumption that it was written contiguously physically. The header of the address indicated by the primary mapping table is read and the physical address for the desired logical cluster read. For host reads, if this matches the address already read on the supposition that the data was written physically contiguously then the data will already have been read and is available to return. If not, then it must be read separately.

The availability of header space within current data structures employed by the file system may limit the size of the cluster groups that are indexed in the primary mapping table. Although the number (N) of clusters in a cluster group that a storage device will be designed to use may vary, in one embodiment N may equal 2 such that the number of index entries that the mapping table contains is 1/N, or ½ in this case, the number of entries that would otherwise be need to track all of the clusters. For storage devices designed with N>2, the main mapping table will be smaller.

Figure 8:
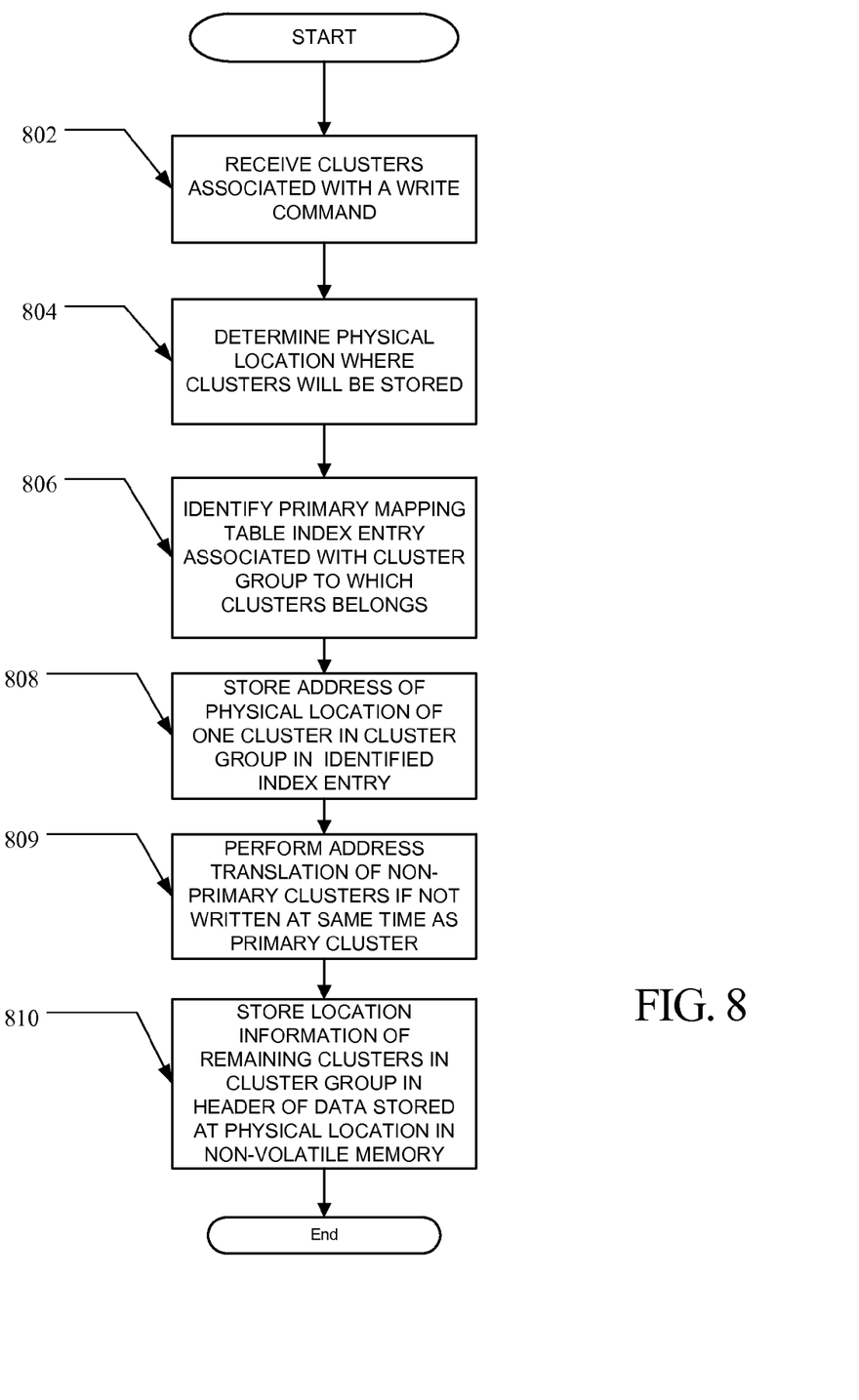
FIG. 8 is a flow diagram of a method for managing logical to physical mapping during write operations in a storage device such as illustrated in FIG. 6.

Referring to FIG. 8, one embodiment of a method for implementing the mapping table illustrated in FIG. 7 is shown. When a write command is received by the storage device, the controller receives the clusters of data associated with that write command (at 802). The controller then determines the physical locations in the non-volatile memory that the clusters will be stored in (at 804). In some instances, the memory management algorithm will write all data for full clusters to an open block as the data arrives so that the data may be contiguously stored in flash. In other implementations, however, the controller may use a categorization of the data to place incoming data into different ones of many open, discontiguous blocks.

Once the controller knows where the clusters will be physically stored, it can then identify in the primary mapping table an index entry associated with each received cluster, where each received cluster is part of a cluster group made up of N clusters as described above (at 806). The controller then stores in the volatile memory, such as DRAM, or other fast access memory, an address of the physical location for the received data associated with one of the clusters in the cluster group in the identified index entry (at 808). The one cluster, or primary cluster, may always be the first logically addressed cluster in the cluster group in one embodiment. If the non-primary cluster(s) are not written at the same time as the primary cluster, then the controller may perform an address translation (at 809). In the header of the user data stored at the physical location in the non-volatile memory, the controller then stores location information for each of a remainder of N clusters in the cluster group associated with the identified index entry (at 810). Thus, the index entry in the mapping table maintained in DRAM contains the address of the physical location of only one of the clusters in the cluster group, and the header of the data at that physical location in the non-volatile memory is written to contain location information for the remainder of the clusters in the cluster group associated with the index entry. In one implementation, the update of the primary mapping table in DRAM and the writing location information for non-primary clusters in the header of the data for the primary cluster is accomplished in a single write operation. A copy of the primary mapping table in DRAM may then be backed up in flash memory.

In implementations where N=2, such that two clusters make up a cluster group, the header of the data at the physical location identified in the primary mapping table will then only include location information for one other cluster. The size of the primary mapping table will also then be 1/N, or ½ in this instance, the size a primary mapping table would otherwise need to be to contain the addresses of each cluster. Instead of dedicating larger amounts of DRAM, and non-volatile memory, to contain a fixed size table for each cluster, the primary mapping table structure and method discussed herein utilize 1) a fixed size primary mapping table containing physical location information for a single cluster in a cluster group of N clusters; and 2) the header of the physical memory identified for the one cluster in the cluster group to contain location information for the remainder of the clusters in the cluster group. When N=2, one cluster in the cluster group is indexed in the primary mapping table in DRAM and the location of the one other cluster in the group is stored in the header of the physical data address for the indexed cluster in non-volatile memory. For implementations where N>2, information on the location of the 2 or more other clusters in the cluster group is written into the header of the physical location of the cluster that is expressly indexed in the primary mapping table.

In one embodiment, the cluster selected to have its physical address used in the primary mapping table entry for each cluster group is referred to as the primary cluster and is the last written cluster within that cluster group. The header of the data stored in non-volatile memory for the primary cluster will contain the location information for the remaining clusters in the cluster group. In other embodiments, the location information for non-primary clusters for a cluster group may be spread out through headers of multiple physical locations of data in the cluster group. For example, the header of the data at the physical location for the primary cluster may contain location information for one of the non-primary clusters, and the header of the data at the physical location for that non-primary cluster may then have location information for a next non-primary cluster in the cluster group, and so on in a chain.

Figure 9:
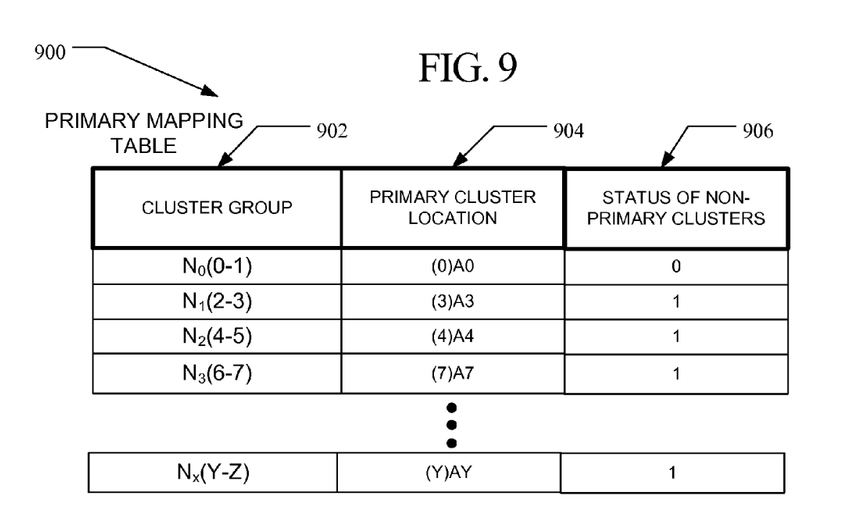
FIG. 9 is an embodiment of the structure of a primary mapping table.
Figure 10:
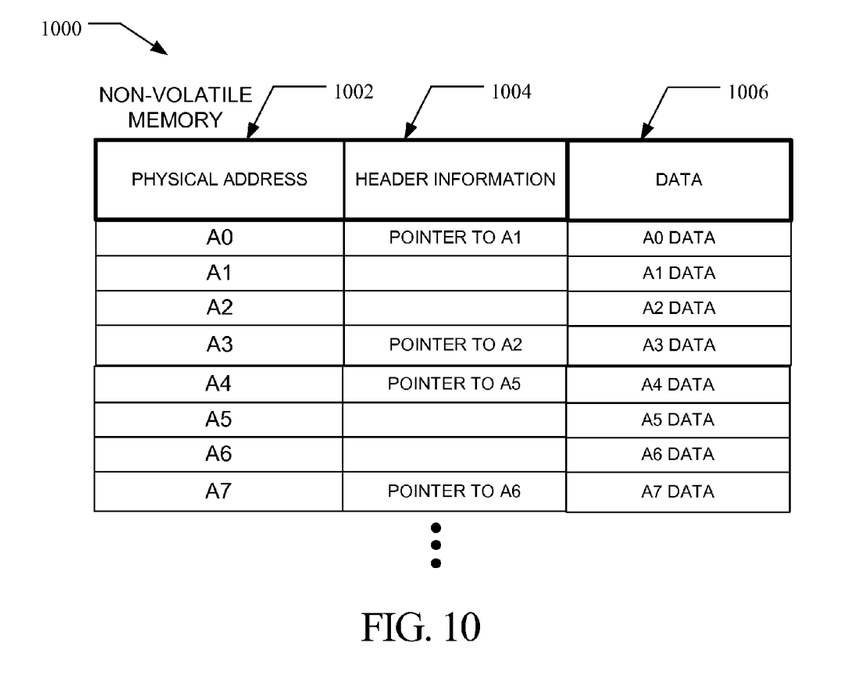
FIG. 10 is an embodiment of the structure of a non-volatile memory associated with the primary mapping table of FIG. 9.

Referring to FIGS. 9 and 10, a hypothetical primary mapping table 900 and non-volatile memory 1000 arrangement is illustrated. In the primary mapping table 900, the cluster groups 902 are assumed to be 2 clusters. For example, the entry for cluster group $N_0$ is associated with logical cluster addresses 0 and 1. The primary mapping table entry for $N_0$ includes a physical address entry 904 for the location of the primary cluster (here cluster 0) in non-volatile memory, where cluster 0 is at physical location A0 in non-volatile memory 1000. Spare bits in each primary mapping table entry may also be used to identify a status (e.g., valid or not valid) of data in each of the non-primary clusters in the cluster group for that entry. In addition, spare bits in each entry may also be used to indicate whether the non-primary clusters in the cluster group are in physically contiguous locations with the physical location of the primary cluster.

In the example of FIG. 9, only valid/invalid status 906 is shown and, because this example illustrates a cluster group that consists of 2 clusters, only one other cluster is in each cluster group so that a single bit is included for status. The status bit is shown as a "0" here indicating that the other cluster in cluster group $N_0$ does not contain valid data. In one embodiment, a status bit is unnecessary for the primary cluster itself because the entry in the main mapping table for the primary cluster may contain a null value. In subsequent entries in the example primary mapping table of FIG. 9, the status of the non-primary clusters are all shown as "1" or valid. Multiple bits may be used in embodiments where each cluster group is larger than 2 clusters. Also, other mechanisms for determining the validity of data for clusters in a cluster group are contemplated. The use of spare bits in an entry of the primary mapping table to include a status 906 indicator and/or a contiguous data location indicator is optional.

As noted above, the controller of the storage device uses the last written cluster for a cluster group as the primary cluster. In the example of FIG. 9, the primary cluster is shown as the first cluster in cluster groups $N_0$ and $N_2$ (clusters 0 and 4, respectively) and the second cluster in cluster groups $N_1$ and $N_3$ (clusters 3 and 7, respectively). If a subsequent write command only includes data for one of the two clusters in the cluster group, and that cluster is not the current primary cluster for the cluster group, then the primary cluster is changed to the most recently written cluster so that the physical location of the new primary cluster is recorded in the primary index table and the location of the former primary cluster is then written into the header of at the physical location of the data in non-volatile memory for the most recently written cluster.

Referring to FIG. 10, the non-volatile memory 1000 may include physical locations each associated with an address 1002 (e.g., A0 et seq.), header information 1004 and data 1006 associated with the physical location. The header information 1004 for physical locations containing data for primary clusters may be supplemented to include the pointer information to the physical locations of the other clusters in the cluster group. In this example, the non-volatile memory arrangement of FIG. 10 is correlated with the primary mapping table 900 of FIG. 9. For ease of illustration, the contiguous clusters of each cluster group are shown as stored in contiguous physical addresses 1002 in non-volatile memory. Although it is expected that clusters in a cluster group will often be written to contiguous physical locations, storage by the controller of the logically sequential clusters for given cluster group into discontiguous physical locations in non-volatile memory are also contemplated. In cases where the assigned physical addresses are discontiguous within a cluster group, the header information 1004 in the primary cluster physical location would simply include the appropriate pointers to the other non-contiguous physical locations.

Figure 11:
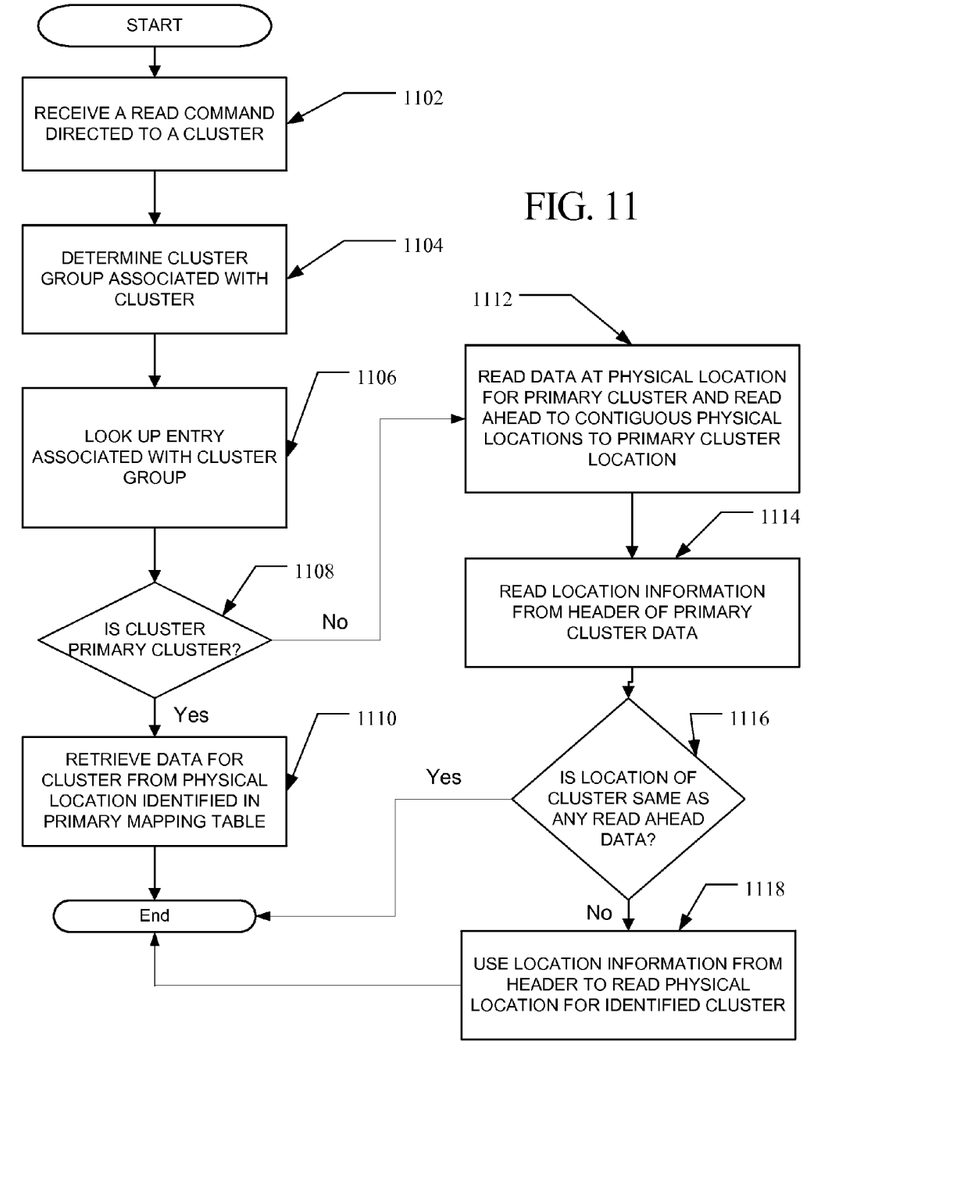
FIG. 11 is a flow diagram of a method for managing logical to physical mapping during read operations in a storage device such as illustrated in FIG. 6.

Referring now to FIG. 11, when a read command is received in a system having the primary mapping table arrangement discussed herein, the controller of the storage device will identify the cluster group associated with the cluster referenced in the read command (at 1102, 1104). The controller will look up the primary mapping table entry for the identified cluster group and see if the particular cluster in the cluster group is the current primary cluster (at 1106). If the cluster is the primary cluster, then the controller can use the physical location in the entry to go directly to the appropriate address in non-volatile memory and read out the requested data from that location (at 1108, 1110). If the cluster identified in the read command is other than the primary cluster, the controller may read the data from the primary cluster data location in physical memory and will read ahead to the next contiguous physical memory locations (at 1112). The read ahead function may include reading ahead a number of clusters worth of data, typically an extra page or two of data in the flash memory depending on the number of clusters in a cluster group, equal to the number of logical clusters between the primary cluster and the desired cluster in the cluster group. Because, in one embodiment, the primary cluster is always the first logically addressed cluster in the cluster group, the read ahead will be for a contiguous data after the data address for the primary cluster data. The data from the single read that includes the primary cluster location and the contiguous read ahead locations may be read into the DRAM cache area of the storage device.

By reading ahead to contiguous physical locations (contiguous to the physical location identified in the primary mapping table for the primary cluster) the storage device may save time over interpreting the location information in the header to definitively find out the location of the other cluster in the cluster group and then executing a second, separate read operation at that identified location. Because clusters in cluster groups are often written to contiguous physical locations, reading ahead to several may end up allowing the data to be read into a buffer in a single read operation which would be faster than consecutive separate read operations. Thus, in one embodiment, the controller will read the location data from the header of the primary cluster physical location and, if the location information indicates that the physical location for the other cluster(s) in the group are those that have already been read ahead in the read operation, the controller can return the already read data in response to the read command (at 1114, 1116). If after reading the location information from the header of the primary cluster location the read ahead ended up not reading data from the location of the desired cluster, then the controller can simply execute a second read operation to the definitive location identified in the header (at 1116, 1118). In an alternative implementation, step 1112 may be modified to only read the primary cluster location without reading ahead such that a second read to the location in the header information will always be made and step 1116 omitted.

In another embodiment, a 'piggyback' scheme to further enhance performance of the reduced size primary mapping table described above may be implemented. Although the primary mapping table is of a fixed size to hold a primary cluster location for each cluster group, there may be instances where there is currently no valid data in a cluster group and the primary mapping table entry is empty for that cluster group. An extra bit in each primary mapping table entry, in addition to the types of status bits discussed above, may provide an indication that there is no valid data in a cluster group. In order to take advantage of the extra space that may then be available in the primary mapping table for non-primary clusters in other cluster groups that do contain valid data, the controller may maintain a table of cluster groups and an associated "piggyback" cluster groups. Alternatively, rather than a table of cluster groups and associated piggyback cluster groups, there may simply be a predetermined relationship between cluster groups, where a particular cluster group entry, if empty, will always be used to piggyback one other specific cluster group. For example, if there only existed a total of 12 cluster groups in a hypothetical system then group 0 could be paired with cluster group 11, 1 with 10, 2 with 9, 3 with 8 and so on (reciprocal pairing). The predetermined relationship embodiment may be less flexible than a table but would not need to be separately stored. In yet other alternative embodiments, there may be more than one paired cluster per cluster. For example, cluster group 0 with 4 and 8, cluster group 1 with 5 and 9, cluster group 2 with 6 and 10 and so on. Pairing more than one cluster group to another cluster group to achieve multiple piggybacking may be implemented using extra bits in the index entry to indicate which paired entry (if any) is being used as a piggyback entry.

The piggyback cluster group would be the cluster group entry in the primary mapping table that another cluster group may use for storing location information for one of its non-primary clusters, when the cluster group for the "piggyback" cluster group is empty (does not contain any valid data). So, for example, the controller may contain a table of cluster groups and associated piggyback cluster groups where (referring to FIG. 9) cluster group $N_0$ is assigned cluster group $N_3$ as its piggyback cluster group. If the controller sees the extra bit (or other indicator) in $N_3$ indicating that there is no valid data in that cluster group, then the controller will use the unused primary index table entry normally reserved for the primary cluster of $N_3$ for a non-primary cluster of $N_0$. The benefit of this piggybacking scheme is that addresses of non-primary clusters may also be opportunistically held in DRAM if the device is not logically full. The non-primary cluster location data piggybacked to the unused primary mapping table entry may also still be maintained in the header of the data for its primary cluster in case the currently empty cluster group later needs the primary mapping table entry space being used by the piggybacked non-primary cluster information.

A system and method has been disclosed for reducing size of the mapping table in a storage device so that the entire mapping table may be held in a smaller amount of DRAM. The granularity of the mapping information is maintained by using available space in the headers of user data in non-volatile memory and associating clusters into cluster groups where a designated primary cluster of a cluster group in indexed in the primary table and the header of the physical location of the primary cluster data includes location information for the remaining clusters in the cluster group.

The methods described herein may be embodied in instructions on computer readable media. "Computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a processor, memory device, computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

It is therefore intended that the foregoing detailed description be regarded as illustrative rather than limiting, and that it be understood that it is the following claims, including all equivalents, that are intended to define the spirit and scope of this invention.

What is claimed is:

1. A method of managing a memory device comprising:
in a memory device having a non-volatile memory, a volatile memory and a controller in communication with the non-volatile memory and the volatile memory, the controller:
maintaining an index table in the volatile memory, the index table configured to store a predetermined number of index entries where each of the predetermined number of index entries is associated with a cluster group, each cluster group having a fixed plurality of clusters, wherein each cluster group comprises a predetermined number of logically contiguous clusters and each of the predetermined number of index entries is configured to contain physical address information for only one cluster of the cluster group associated with that index entry;
receiving data in a data write command, the received data associated with a particular cluster;
determining a physical location in the non-volatile memory for storing the particular cluster;
identifying in the index table an index entry associated with the particular cluster;
storing in the volatile memory an address of the physical location for the particular cluster in the identified index entry;
storing in the physical location in the non-volatile memory the received data for the particular cluster; and
storing, in a header of the received data stored at the physical location, location information of each of a remainder of the fixed plurality of clusters in the cluster group associated with the identified index entry, whereby the identified index entry in the volatile memory contains the address of the physical location of only the particular cluster in the cluster group, and the header of the received data at the physical location contains location information for the remainder of the fixed plurality of clusters in the cluster group associated with the identified index entry.

2. The method of claim 1, wherein storing the received data and storing location information of each of the remainder of the fixed plurality of clusters in the cluster group is performed in a single write operation to the physical location.

3. The method of claim 1, wherein storing the address of the physical location comprises replacing any prior cluster address in the identified index entry with the address of the physical location.

4. The method of claim 1, wherein the index table is a fixed-size table.

5. The method of claim 1, wherein the received data comprises data associated with a plurality of clusters having logical addresses associated with a particular index entry, and wherein storing the address of the physical location comprises:
storing in the volatile memory the address of the physical location of data for a most recently received one of the clusters associated with the particular index entry;
storing in the non-volatile memory at the address the data of the most recently received one of the clusters associated with the particular index entry and storing location information for all other data groups in the cluster group associated with the particular index entry in a header of the data stored at the address.

6. The method of claim 1, wherein the predetermined number of logically contiguous clusters is 2.

7. The method of claim 1, further comprising:
receiving a read command identifying a requested cluster;
determining a cluster group association for the requested cluster;
retrieving from the index table in the volatile memory a physical location in the non-volatile memory of one cluster in the determined cluster group, wherein the one cluster is not the requested cluster;
retrieving data from the retrieved physical location; and
determining location information for the requested cluster from a header of the retrieved data.

8. The method of claim 1, wherein the location information stored in the header comprises at least one pointer.

9. The method of claim 1, further comprising:
storing, in the identified index entry in the volatile memory, an indication of whether each of the clusters in the cluster group associated with the identified index entry are associated with currently valid data.

10. The method of claim 9, further comprising the controller determining whether a second index entry associated with a second cluster group is empty and, when the second index entry is determined to be empty, storing an address of a physical location of another of the clusters in the cluster group associated with the identified index entry in the second index entry.

11. A memory device comprising:
a non-volatile memory;
a volatile memory; and
a controller in communication with the non-volatile memory and the volatile memory, wherein the controller is configured to:
maintain an index table in the volatile memory, the index table sized to store a predetermined number of index entries where each of the predetermined number of index entries is associated with a cluster group, each cluster group comprising a predetermined number of logically contiguous clusters and each of the predetermined number of index entries is configured to contain physical address information for only one cluster of the cluster group associated with that index entry;
receive data in a data write command, the received data associated with a particular cluster;
determine a physical location in the non-volatile memory for storing the particular cluster;
identify in the index table an index entry associated with the particular cluster;
store in the volatile memory an address of the physical location for the particular cluster in the identified index entry;
store in the physical location in the non-volatile memory the received data for the particular cluster; and
store, in a header of the received data stored at the physical location, location information of each of a remainder of the clusters in the cluster group associated with the identified index entry, whereby the identified index entry in the volatile memory contains the address of the physical location of only the particular cluster in the cluster group, and the header of the received data at the physical location contains location information for the remainder of the clusters in the cluster group associated with the identified index entry.

12. The memory device of claim 11, wherein the controller is configured to store the received data and store location information of each of the remainder of the clusters in the cluster group in a single write operation to the physical location.

13. The memory device of claim 11, wherein the controller is further configured to store the address of the physical location by replacing any prior cluster address in the identified index entry with the address of the physical location.

14. The memory device of claim 11, wherein the index table is a fixed-size table.

15. The memory device of claim 11, wherein the received data comprises data associated with a plurality of clusters having logical addresses associated with a particular index entry, and wherein to store the address of the physical location the controller is configured to:
store, in the volatile memory, the address of the physical location of data for a most recently received one of the clusters in the cluster group associated with the particular index entry;
store, in the non-volatile memory at the address, the data of the most recently received one of the clusters in the cluster group associated with the particular index entry; and
store location information for all other clusters in the cluster group associated with the particular index entry in a header of the data stored at the address.

16. The memory device of claim 11, wherein the predetermined number of logically contiguous clusters is 2.

17. The memory device of claim 11, wherein the controller is further configured to:
receive a read command identifying a requested cluster;
determine a cluster group association for the requested cluster;
retrieve from the index table in the volatile memory a physical location in the non-volatile memory of one cluster in the determined cluster group, wherein the one cluster is not the requested cluster;
retrieve data from the retrieved physical location; and
determine location information for the requested cluster from a header of the retrieved data.

18. The memory device of claim 11, wherein the location information stored in the header comprises at least one pointer.

19. The memory device of claim 11, wherein the controller is further configured to:
store, in the identified index entry in the volatile memory, an indication of whether each of the clusters in the cluster group associated with the identified index entry are associated with currently valid data.

20. The memory device of claim 19, wherein the controller is further configured to determine whether a second index entry associated with a second cluster group is empty and, when the second index entry is determined to be empty, to store an address of a physical location of another of the clusters in the cluster group associated with the identified index entry in the second index entry.

* * * * *